Dec. 29, 1931.  T. C. MOORSHEAD  1,838,435
GLASS SHAPING MACHINE
Filed Feb. 7, 1929    6 Sheets-Sheet 1

Dec. 29, 1931. T. C. MOORSHEAD 1,838,435
GLASS SHAPING MACHINE
Filed Feb. 7, 1929 6 Sheets-Sheet 5

Inventor
Thomas Courtney Moorshead
By
Pennie Davis Marvin & Edmonds
attorneys

Dec. 29, 1931.                    T. C. MOORSHEAD                    1,838,435
                                GLASS SHAPING MACHINE
                            Filed Feb. 7, 1929      6 Sheets-Sheet 6
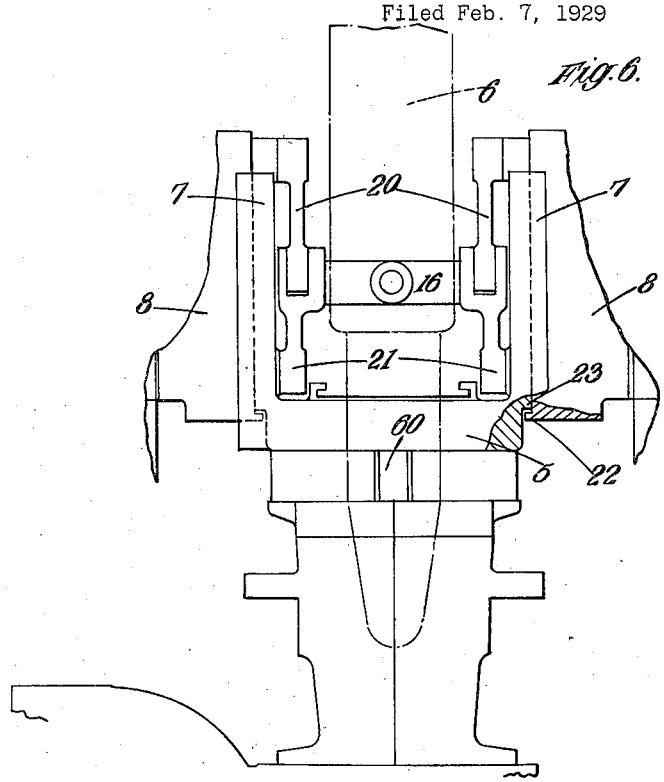
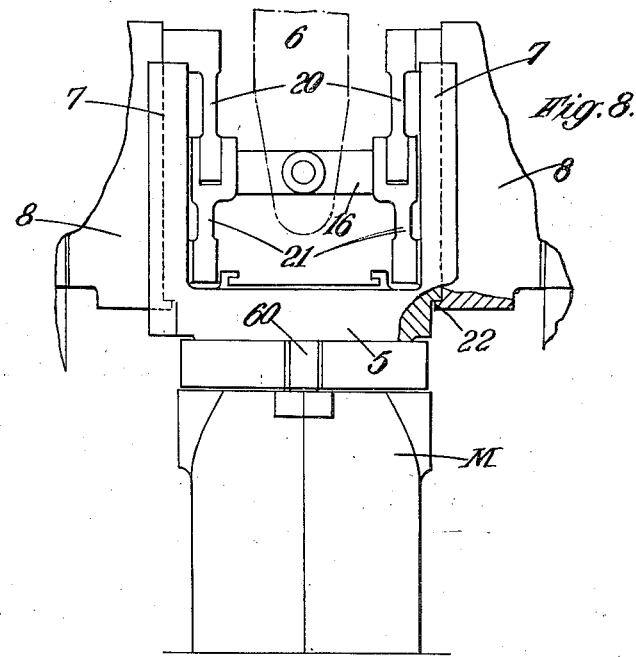
Inventor
Thomas Courtney Moorshead
By
Pennie Davis Marvin & Edmonds
attorneys Patented Dec. 29, 1931

1,838,435

UNITED STATES PATENT OFFICE

THOMAS COURTNEY MOORSHEAD, OF LONDON, ENGLAND, ASSIGNOR TO THE UNITED GLASS BOTTLE MANUFACTURERS, LIMITED, OF LONDON, ENGLAND, A BRITISH COMPANY

GLASS SHAPING MACHINE

Application filed February 7, 1929, Serial No. 338,079, and in Great Britain December 18, 1928.

This invention relates to glass shaping machines for the purpose of manufacturing bottles or other glass containers in an automatic manner and is concerned more particularly with machines of the press and blow type in which a register head is provided for accurately registering a neck mould with a blank mould or a finishing mould arranged beneath the neck mould.

According to the present invention an improved construction of machine is provided in which the neck mould is carried by, and caused to move with, the register head so as to permit the blank mould to be moved into the pressing position unhindered by contact with the neck mould. When the blank mould reaches the pressing position the register head and the neck mould are lowered together until the underside of the latter abuts against the top of the blank mould and the blank mould is accurately registered with the neck mould and the superposed pressing plunger mechanism. The register head may be arranged so that the neck mould is pressed into intimate contact with the blank mould during the operation of the pressing plunger which descends through the register head and neck mould into the cavity within the blank mould. At the completion of the pressing operation, the neck mould and the register head may be raised slightly to free the former from contact with the top surface of the blank mould so that the latter may be opened to free the parison and moved out from beneath the neck mould unhindered by frictional contact with it. At this stage the parison is left suspended by its neck from the neck mould and the register head and the neck mould are preferably caused to descend again until, in this instance, their downward movement is arrested by suitably arranged stops. The finishing mould may then be closed around the suspended parison and accurately registered with the neck mould after which the article may be blown in the usual manner. The neck mould is then opened and raised with the register head ready to allow the recharged blank mould to be moved into the pressing position. A series of blank moulds may be provided which may be mounted upon hinged supports carried by a frame rotatable around a central support so that each mould is in turn adapted to be swung inwardly into a pressing position and, after the pressing operation has been completed, to be opened and swung outwardly ready to receive another charge of glass.

In order that the said invention may be clearly understood and readily carried into effect the same will now be described with reference to the accompanying drawings which illustrate, by way of example, one convenient form of machine embodying the invention and in which:—

Figure 6 is a view similar to Figure 5 showing the neck mould registering with a blank mould;

Figure 8 is a view similar to Figures 5, 6 and 7 showing the register head and the neck mould lowered again ready for the registration of the latter with the finishing mould.

Figure 1:
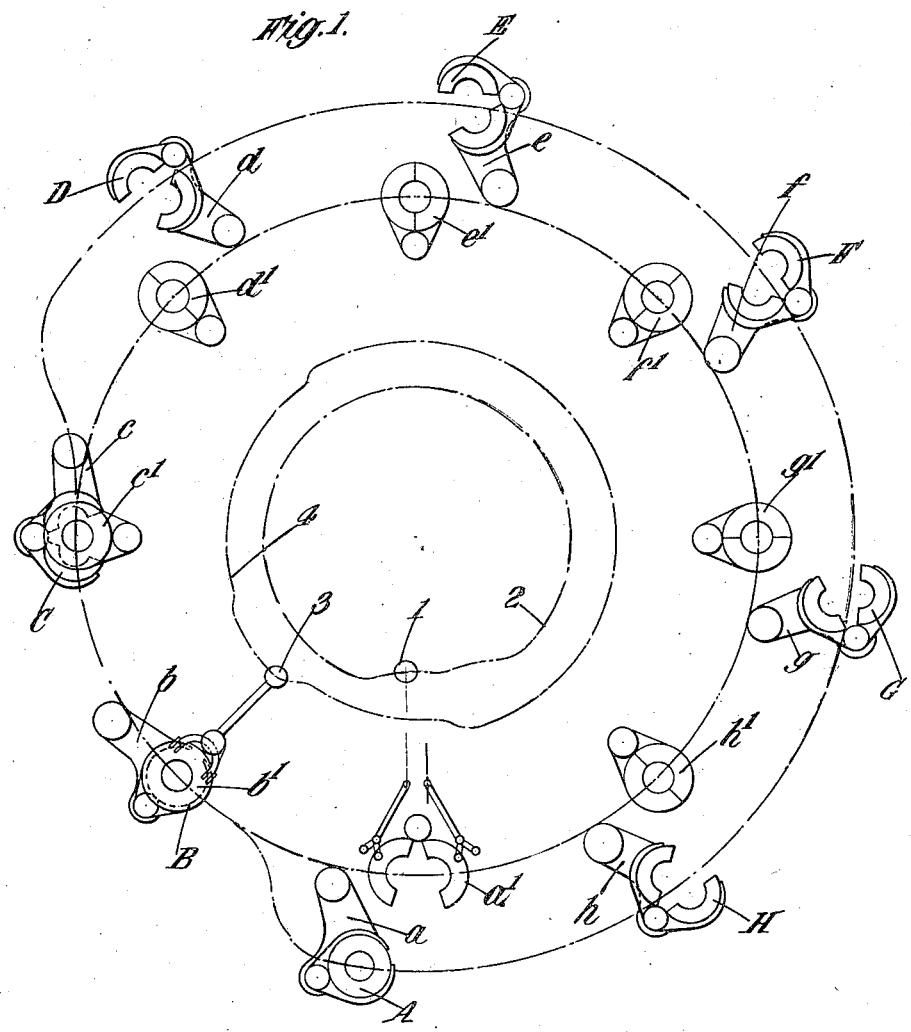
Figure 1 is a part sectional plan showing the blank moulds in various positions.
Figure 2:
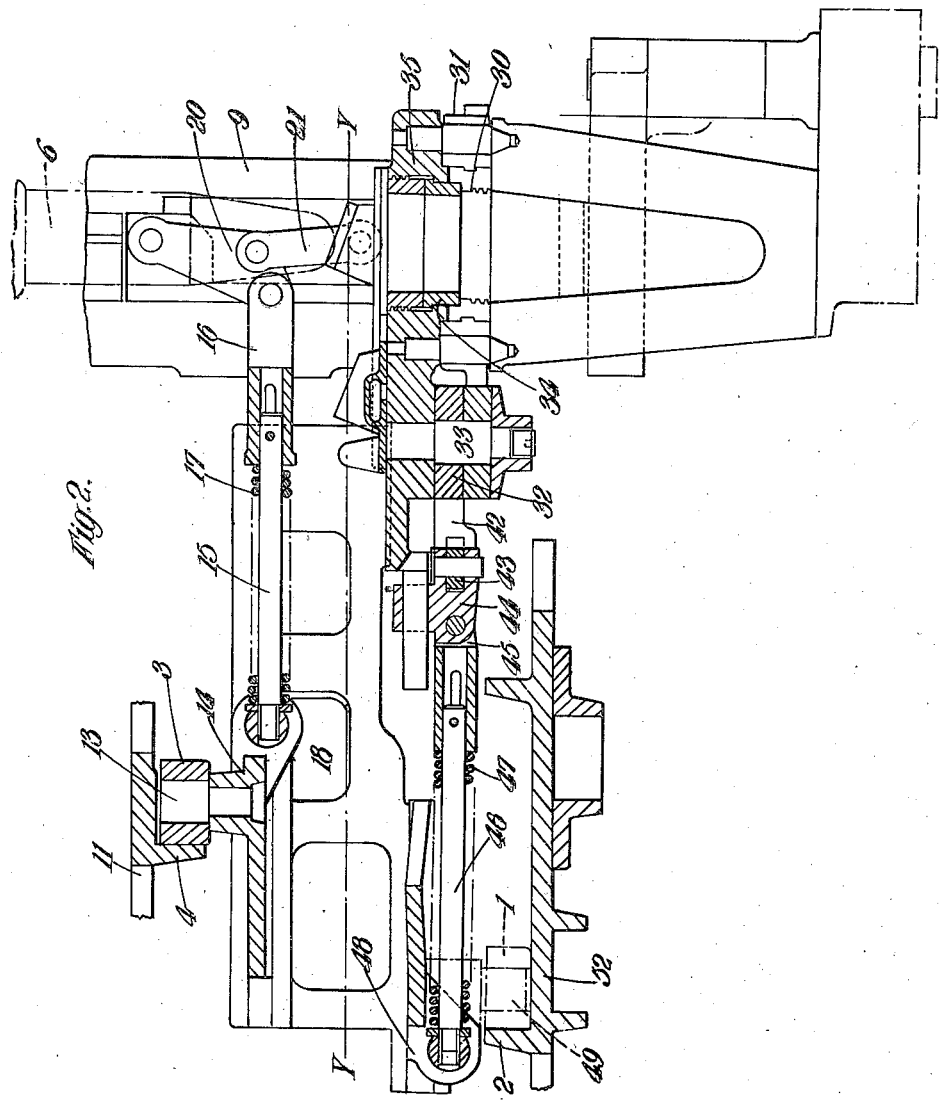
Figure 2 is a sectional elevation of a part of the machine showing one of the register heads and the neck mould carried thereby and the means for operating these parts, the section being taken on line X—X of Figure 4.
Figure 3:
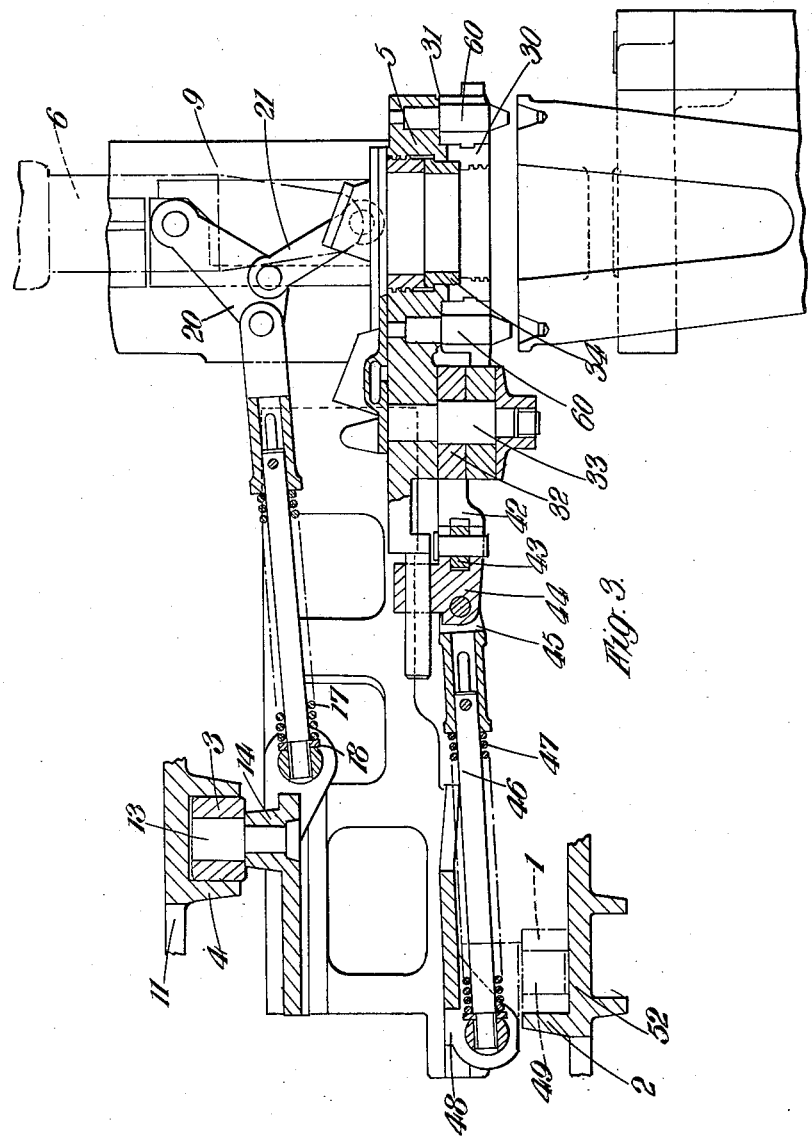
Figure 3 is a view similar to Figure 2 showing the register head and the neck mould in their raised positions.
Figure 4:
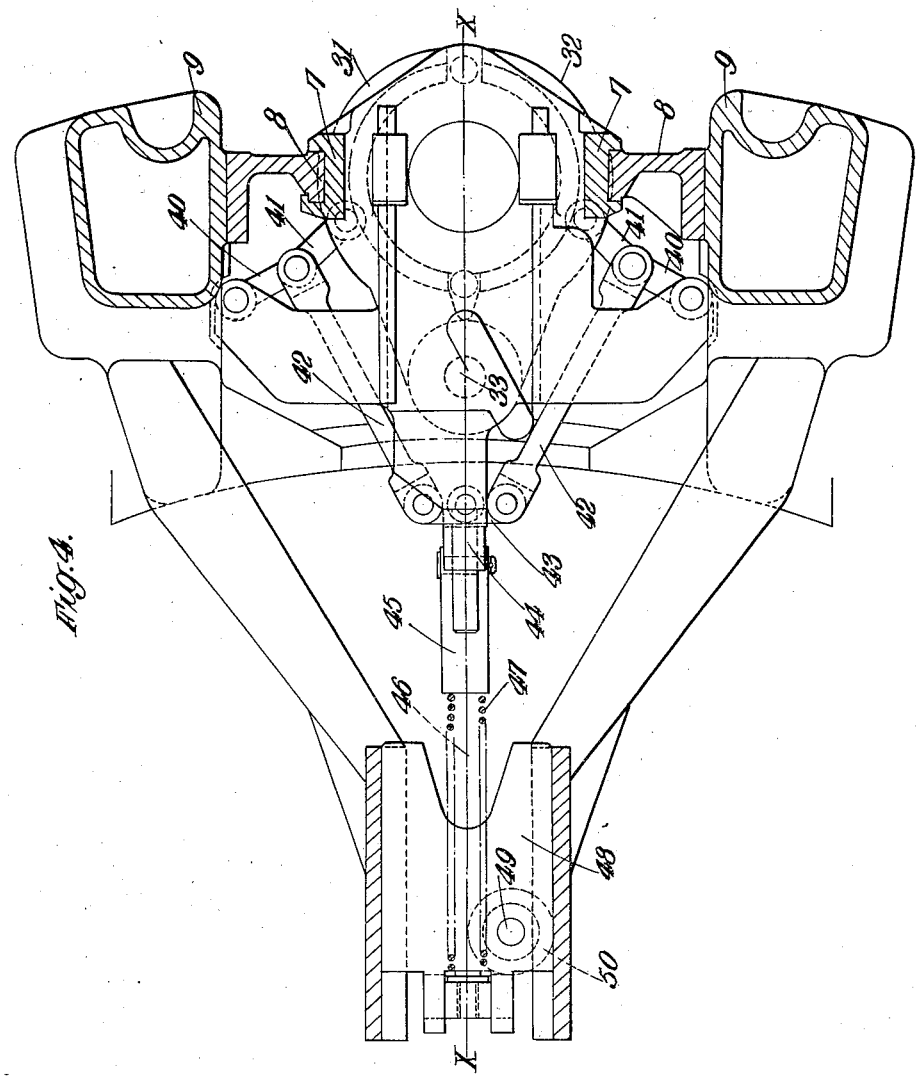
Figure 4 is a partial plan view of the machine on line Y—Y of Figure 2.
Figures 5, 7:
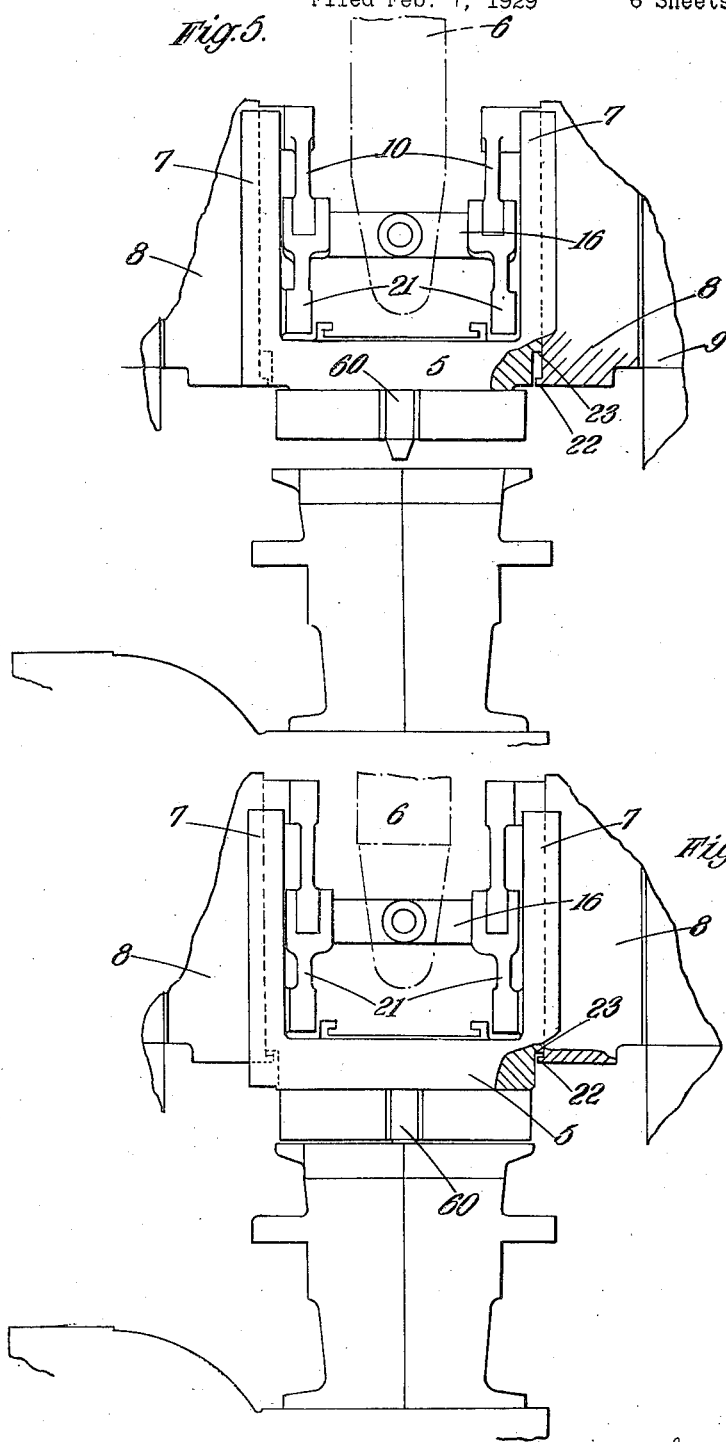
Figure 5 is a front elevation of a part of the machine showing the register head and the neck mould in their raised positions.
Figure 7 is a view similar to Figures 5 and 6 showing the register head and the neck mould raised slightly to permit withdrawal of the blank mould after the pressing operation.

In Figure 1 a set of eight blank moulds and eight neck moulds are indicated diagrammatically, the register heads, pressing plungers and other parts being omitted for the sake of clearness. The blank moulds A, B, C, D, E, F, G and H are mounted upon hinged supports a, b, c, d, e, f, g and h which are carried by a frame rotatable around a vertical support as described, for instance, in specification of my British Patent No. 281,383. The neck moulds $a^1$, $b^1$, $c^1$, $d^1$, $e^1$, $f^1$, $g^1$ and $h^1$ are also carried by the frame so that they rotate therewith and are each made of two parts which are adapted to be moved toward and away from one another to open and close the mould (as hereinafter described) through the medium of a roller 1 which engages a fixed cam track 2 carried by the vertical support. The blank moulds normally occupy the outer positions, i. e., the positions in which the moulds A, D, E, F, G and H are shown, so that during the rotation of the machine the moulds pass beneath a glass feeder and are each in turn supplied with a charge of glass. At the position indicated by the mould A the neck mould $a^1$ is open and, with the register head, is in its raised position shown in Figure 3. Between the positions indicated by the moulds A and B the charged blank mould is swung inwardly to the position indicated by the mould B. The neck mould $a^1$ is meanwhile closed and, by the action of a roller 3 which engages another fixed cam track 4 carried by the vertical support above referred to the neck mould is then caused to descend with the register head until the underside of the neck mould abuts against the top of the charged blank mould as shown in Figure 2. The pressing operation is then performed and at the position indicated by the mould C the neck mould and the register head are raised slightly so that the former is free from contact with the blank mould which is then opened and afterwards swung outwardly upon its hinged support to the position indicated by the mould D.

In Figures 2 to 8, 5 is a register head which is formed with a central bore to permit of the passage through it of the pressing plunger 6. Extending upwardly on either side of the register head, of which they form a part, are two guiding members 7—7 which are adapted to slide vertically upon the guides 8 which are attached to and form a part of the revolving frame 9 of the machine. The register head is raised and lowered upon these guides by the action of the cam track 4 (see Figures 1, 2 and 3) which is formed upon a stationary cam ring 11 attached to the central vertical support (not shown) about which the machine is adapted to rotate. Engaging the track 4 is the roller 3 which is mounted upon a stud 13 carried by a slide 14 which, through the medium of a rod 15, is caused to impart movement to a yoke 16. The connection between the rod 15 and the yoke 16 is a yieldable one provided by forming the rod so that its end is free to slide in a sleeve formed at the end of the yoke and by surrounding the rod with a spring 17 one end of which bears against the end of the sleeve and the other end of which bears against a flange 18 which is formed on the rod 15. By this arrangement the yoke is caused to follow the in and out horizontal movements of the roller 3. The yoke 16 is in turn caused to operate two pairs of toggle links which are arranged at opposite sides of the register head and the upper links 20 of which are pivoted on the guides 8 while the lower links 21 are pivoted on the register head. The guides 8 are formed adjacent their lower ends with inwardly projecting parts or stops 22 which are adapted to come into contact with a shoulder 23 on the register head in order to limit the downward movement of the latter when a blank mould is not positioned thereunder.

The neck mould 30 is made in halves which are housed within a pair of arms 31 and 32 which are hinged together upon a stud 33 which is secured to and depends from the underside of the register head. In its closed position the neck mould is in axial alignment with the central bore of the register head, being thus centered by a cylindrical spigot 34 which projects from the underside of the register head and which is embraced by a corresponding recess formed in the upper parts of the arms 31 and 32. The neck mould arms are at all times maintained in contact with the underside of the register head, being raised and lowered by the corresponding movements of the register head. The neck mould is opened and closed by the pivotal movements of the arms 31 and 32 about the stud 33 and these movements are brought about through the medium of the means similar to those described in the specification of my British Patent No. 281,383 above referred to. These means are shown in detail in Figures 2, 3 and 4 and comprise links 40 and 41, connecting rods 42, equalizing link 43, slide 44, forked member 45, rod 46, spring 47, slide 48, stud 49 and the roller 1. The roller 1 is arranged so that it travels within the cam track 2 which is formed upon a fixed cam ring 52 attached to the central stationary support referred to above.

The means for registering the blank and the finishing moulds with the neck moulds comprise pins 60 which project downwardly from the undersides of the register heads and extend between the neck mould arms. The lower ends of these pins are of conical formation and are adapted, when the register heads are in their lower positions, to enter and engage corresponding recesses at the upper ends of the blank and finishing moulds so as to hold each at different times in axial alignment with the register head and the neck mould.

The operation of the register head and neck mould are as follows:—

A blank mould B, its two halves closed, having received its charge of glass while travelling along the outer circle of moulds (see Figure 1) is swung upon its arm $b$ from the position shown by the mould A to that shown by the mould B. At this stage the register head 5 and the neck mould 30 associated with the blank mould B are in their raised position shown in Figures 3 and 5 so that the pins 60 are clear of the top of the blank mould. The two halves of the neck mould are now closed by the action of the roller 1 and the neck mould arms 31 and 32 and, as soon as the blank mould is positioned beneath the neck mould, the register head and the neck mould are caused to descend together by the action of the roller 3 operating through the toggle linkage 20, 21, the registering pins 60 entering the recesses formed in the top of the blank mould so as accurately to register the parts in position. The downward movement of the register head is finally arrested by the underside of the neck mould and its arms 31 and 32 coming into contact with the upepr face of the blank mould (as shown in Figures 2 and 6) against which it is pressed by the action of the cam track 4 acting through the spring 17 upon the register head toggle linkage 20, 21 described above. The blank mould B is carried upon its support $b$ at such a height in relation to the stops 22 formed upon the guides 8, that when the neck mould is seated upon the upper face of the blank mould, the shoulder 23 is spaced from the stops as will be seen from Figure 6. The pressing operation is then performed, the pressing plunger 6 passing through the register head 5 and the neck mould 30 into the cavity within the blank mould B. The pressing plunger is then withdrawn and by reason of the formation of the cam track 4 and the employment of the compression spring 17, the register head 5, the neck mould 30 and the arms 31 and 32 are then raised slightly to the position shown in Figure 7 so that the face of the neck mould is just clear of that of the blank mould. The blank mould B is now opened by separating the two halves and is then swung outward upon its support $b$ to its position in the outer circle of moulds as shown by the mould D in Figure 1 leaving the parison suspended from the neck mould. The cam track 4 then causes the register head and the neck mould to descend again until, in this instance, the shoulder 23 formed on the underside of the register head comes into contact with the stops 22 as shown in Figure 8. The finishing mould M is then raised and closed around the suspended parison and is accurately registered with the neck mould by the registering pins 60. The bottle is then blown in the usual manner and at the completion of this operation the neck mould is opened by the action of the roller 1 and the neck mould arms 31 and 32. By the action of the roller 3 the register head and the neck mould are then raised to a position in which the registering pins are clear of the top of the finishing mould and, after the finishing mould containing the blown bottle has been removed from beneath the neck mould, the latter is closed ready to be lowered again into contact with the top of the recharged blank mould when the cycle of operations described above is repeated.

What I claim and desire to secure by Letters Patent of the United States is:—

1. A glass shaping machine comprising the combination of a blank mould, a vertically movable register head, a neck mould carried by the register head, a stationary cam track, and means for raising and lowering the register head and the neck mould comprising toggle links actuated by a roller engaging the said cam track.

2. A glass shaping machine comprising the combination of a rotatably mounted frame having a plurality of blank moulds, neck moulds and vertically movable register heads mounted thereon, and means for moving the blank moulds in a horizontal plane so that at times they are rotating in an outer circle and in an upright position past a charging orifice and at other times are rotating in an inner circle to co-operate with the neck moulds, the said neck moulds being made of two parts which are pivotally mounted upon the undersides of the register heads.

3. A glass shaping machine comprising the combination of a frame rotatable about a central vertical support and having a plurality of blank moulds, neck moulds and vertically movable register heads mounted thereon, a stationary cam track mounted on the support, supporting arms for the blank moulds, means by which the cam track is caused to move the supporting arms with the blank moulds thereon in a horizontal plane so that at times the blank moulds are rotating in an outer circle to receive a charge of glass and at other times are rotating in an inner circle to co-operate with the neck moulds, the said neck moulds being made in halves and housed within arms which are pivotally mounted on the undersides of the register heads, and means being provided for raising and lowering the register heads.

4. A glass shaping machine comprising the combination of a blank mould, a neck mould, means for moving the blank mould in a horizontal plane into and out of position beneath the neck mould, and a vertically movable register head for accurately registering the blank mould with the neck mould, the said neck mould being carried by and caused to move with the register head in a vertical direction relatively to said blank mould.

5. A glass shaping machine comprising a blank mould formed of separable parts, means to move said parts together or apart in a horizontal plane, a neck mould, and a vertically movable register head for accurately registering the blank mould with the neck mould, the said neck mould being carried by and caused to move with the register head in the vertical direction relatively to said blank mould.

6. A glass shaping machine comprising a blank mould, a neck mould, means for raising the neck mould to facilitate movement of the blank mould into and out of position beneath the neck mould, fixed stops, means to move the neck mould downwardly until at one time it is arrested by the blank mould and at another time by the fixed stops, a finishing mould, and means to move the finishing mould upwardly into engagement with the neck mould when the latter is located by said fixed stops.

7. A glass shaping machine comprising a blank mould formed of a plurality of parts separable by movement in a horizontal plane, a neck mould, a vertically movable register head for accurately registering the blank mould with the neck mould, the said neck mould being carried by and caused to move with the register head in a vertical direction relatively to said blank mould, a plunger movable into and out of the blank mould to press into the glass therein, means to move the register head to press the neck mould firmly against the blank mould when the plunger presses into the glass in the blank mould and to raise the register head and neck mould to facilitate separation of the parts of the blank mould.

THOMAS COURTNEY MOORSHEAD.